United States Patent
Juntunen

(10) Patent No.: US 7,418,259 B2
(45) Date of Patent: Aug. 26, 2008

(54) APPARATUS, AND ASSOCIATED METHOD, FOR DEMONSTRATING AN OPERATIONAL CAPABILITY OF A RADIO DEVICE

(75) Inventor: Esa Juntunen, Sammamish, WA (US)

(73) Assignee: Nokia Corporation, Espoo (FI)

( * ) Notice: Subject to any disclaimer, the term of this patent is extended or adjusted under 35 U.S.C. 154(b) by 140 days.

(21) Appl. No.: 11/032,506

(22) Filed: Jan. 10, 2005

(65) Prior Publication Data
US 2006/0154655 A1 Jul. 13, 2006

(51) Int. Cl.
*H04M 3/00* (2006.01)
(52) U.S. Cl. ............... 455/418; 455/414.1; 455/414.2; 455/414.3; 455/550.1
(58) Field of Classification Search .......... 455/418, 455/414.1–3, 550.1, 414.1–414.3
See application file for complete search history.

(56) References Cited

U.S. PATENT DOCUMENTS

| | | | |
|---|---|---|---|
| 5,809,286 A * | 9/1998 | McLain et al. ............. 703/23 |
| 6,158,031 A * | 12/2000 | Mack et al. ............... 714/724 |
| 6,647,102 B2 * | 11/2003 | Hirai et al. ............. 379/100.01 |
| 2003/0065738 A1 * | 4/2003 | Yang et al. ............... 709/215 |
| 2004/0130564 A1 * | 7/2004 | Smith ....................... 345/705 |
| 2004/0266423 A1 * | 12/2004 | Morikawa et al. .......... 455/424 |
| 2005/0113123 A1 * | 5/2005 | Torvinen .................. 455/519 |
| 2005/0159141 A1 * | 7/2005 | Osborn, Jr. .............. 455/414.2 |
| 2006/0072821 A1 * | 4/2006 | Rantapuska ............... 455/423 |
| 2006/0140125 A1 * | 6/2006 | Ottinger et al. ........... 370/241 |

* cited by examiner

*Primary Examiner*—Duc Nguyen
*Assistant Examiner*—Eric Elcenko
(74) *Attorney, Agent, or Firm*—Banner & Witcoff, Ltd.

(57) ABSTRACT

Apparatus, and an associated method, for demonstrating a capability of a mobile station. A demonstration mode is defined at the mobile station. A user of the mobile station selects operation of the mobile station in the demonstration mode and which of the mobile station capabilities to be demonstrated.

26 Claims, 4 Drawing Sheets

APPARATUS, AND ASSOCIATED METHOD, FOR DEMONSTRATING AN OPERATIONAL CAPABILITY OF A RADIO DEVICE

The present invention relates generally to a manner by which to demonstrate operational capabilities of a portable radio device, such as a mobile station operable in a cellular, or other, radio communication system. More particularly, the present invention relates to apparatus, and an associated method, by which to select and thereafter to cause demonstration of the selected operational capability at the mobile station.

A demonstration mode is provided. When operated in the demonstration mode, the selected mobile-station capability is demonstrated even if operating conditions preclude actual operation, in an operational mode, of the mobile station in a manner that otherwise would demonstrate the selected operational capability. End users, training personnel, prospective customers, and others are able to view the operational capability of the mobile station through placement of the mobile station in the demonstration mode and selection of the operational capability to be demonstrated.

BACKGROUND OF THE INVENTION

Advancements in communication technologies have permitted the development and deployment of many new types of communication devices usable by which to effectuate many different types of communication services.

In general, a communication service is effectuated by, or between, communication devices. The communication devices variously form sending stations that operate to send communication data and receiving stations that operate to receive communication data. Communication data sourced at, or otherwise provided to, a sending station is communicated to a receiving station by way of a communication channel.

Some communication devices operate both to send and to receive communication data, thereby to permit two-way communication of data between a set of communication devices. The communication devices are sometimes constructed to be operable to communicate communication data upon radio channels defined upon portions of the electromagnetic spectrum. A communication system in which the communication devices are interconnected by radio channels, thereby communicate by way of the radio channels, is referred to as a radio communication system.

A radio communication system advantageously provides for communications even when the communication devices operable therein can not be interconnected by way of wirelines upon which communication channels are defined. A wireline communication system, in contrast, requires that the communication devices operable therein be interconnected by way of wireline connections. Free of the need to interconnect the communication devices with such wireline connections, the communication devices of a radio communication system are positionable at locations between which wireline connections are unavailable. Additionally, free of the need to interconnect the communication devices with wireline connections, one, or more, of the communication devices between which data is communicated is permitted mobility, thereby permitting the radio communication system to form a mobile communication system.

A cellular communication system is exemplary of a mobile communication system. Network infrastructures of cellular communication systems of various constructions, i.e., constructed pursuant to various standard operational specifications, have been installed throughout significant portions of the populated areas of the world. Voice and data communication services are effectuable by way of cellular communication systems. Increasingly data-intensive communication services are permitted through use of new-generation cellular communication systems. Users communicate telephonically, typically through the use of portable communication devices that are sometimes referred to as mobile stations. A mobile station is a radio transceiver, capable of communicating with a communication entity of the network infrastructure of a cellular communication system in whose coverage area that the mobile station is positioned. A mobile station includes radio transceiver circuitry, i.e., forms both a receiving station and a sending station to permit two-way communications with the communication entity of the network infrastructure. A mobile station is typically of small dimensions to permit its hand carriage by a user.

In some aspects, a mobile station operable in a cellular communication system corresponds to a conventional telephonic handset and includes microphonic and speaker transducers and a telephonic keypad. A mobile station also typically includes a user display for displaying information in visual, or other human perceptible, form. The user displays of many mobile stations are formed of liquid crystal displays having multiple-color display capabilities and high pixel-density configurations.

Mobile stations are sometimes constructed to incorporate capabilities that provide advancements over earlier-constructed mobile stations and to provide user-interface, and other, capabilities that provide new or unique advantages through their use. The unique capabilities of a mobile station also sometimes provide manufacturers and sellers of the mobile station with marketing advantages. That is to say, selection for purchase or other use of a mobile station is sometimes, if not often times, made as a result of the unique capabilities of the mobile station.

However, particularly when the mobile-station capability is first provided at the start of a production cycle, the capability, although perhaps incorporated into the functionality of the mobile station, is not readily usable as the communication system in which the mobile station is to be operated fails to provide the functionality permitting the mobile-station capability to be evident to a user of the mobile station. Or, particularly with respect to pre-production models, the operability of the feature-providing part of the mobile station associated with the mobile-station capability is not fully working, that is, is not free of defects. The capability of the mobile station might again not be evident to a user or perspective purchaser if the capability-providing feature is not fully operational at the mobile station.

A mechanism by which to demonstrate a capability of a mobile station irrespective of whether the capability-producing feature of the mobile station is fully operational or whether the mobile station is positioned in a communication system that permits the capability to be evidenced would be beneficial.

It is in light of this background information related to mobile stations, or other radio devices, operable in a radio communication system that the significant improvements of the present invention have evolved.

SUMMARY OF THE INVENTION

The present invention, accordingly, advantageously provides apparatus, and an associated method, by which to demonstrate operational capabilities of a portable radio device, such as a mobile station operable in a cellular, or other, radio communication system.

Through operation of an embodiment of the present invention, a manner is provided by which to select, and thereafter to cause, demonstration of the selected operational capability at the mobile station.

A demonstration mode in which the mobile station is selectably operable is defined. When the mobile station is selected to be operated in the demonstration mode, a selected mobile-station capability is permitted to be caused to be demonstrated even if operating conditions preclude actual operation, in an operational mode, of the mobile station in a manner that would otherwise demonstrate the selected capability.

Through the demonstration of the selected mobile-station capability when the mobile station is operated in the demonstration mode, the mobile-station capability is evidenced to one viewing the mobile station. In the event, e.g., that the functionality at the mobile station or of the network with which the mobile station operates does not otherwise permit the mobile-station capability to be evidenced when the mobile station is operated in a normal operating mode, the advantages associated with the mobile-station capability are still demonstrable through operation of the mobile station in the demonstration mode.

A prospective end user, such as a prospective purchaser of the mobile station is thereby able to view the operation of the mobile station in a manner to evidence the mobile-station capability even when the mobile station, when operated in the operational mode, would be unable to evidence the capability. Sales personnel are able, thereby, better to promote sales of a mobile station having the mobile-station capabilities in the event that evidencing of the capabilities would otherwise be unavailable in a normal operational mode. Training personnel, or the like, also are able better to provide instruction regarding operation of the mobile station in a manner that evidences the mobile-station capability as the capability is caused to be evidenced irrespective of the availability of the display of the capability when the mobile station is operated in a normal operational mode. In a training, or other, scenario, the mobile station need not even be a working mobile station, i.e., operational in an operational mode. The mobile station need only be constructed to be operable in the demonstration mode to evidence the capability of the mobile station.

In another aspect of the present invention, the mobile station is constructed to provide a plurality of mobile-station capabilities. Any of the plurality of mobile-station capabilities is selectably caused to be demonstrated when the mobile station is operated in the demonstration mode. More than one mobile-station capability is selectable for demonstration of its capability. The capabilities are cause to be demonstrated, for instance, sequentially responsive to selection of a list of more than one mobile-station capability. Or, each of the plurality of capabilities are caused to be demonstrated, one after another, in a pre-ordained sequence. The list of mobile-station capabilities is changeable. For instance, the software determinative of the operation of the mobile station and its capabilities is sometimes upgraded. As a result of a software, or other upgrade, additional capabilities are sometimes added to the mobile station. The additional capabilities are listed, available for selection when the mobile station is operated in the demonstration mode to evidence the additional mobile-station capability or capabilities. Deletion from the list, also, is permitted, e.g., in the event that the capability is removed from the mobile station or if demonstration of the capability need no longer be demonstrated.

In one implementation, a user of the mobile station selects operation of the mobile station in the demonstration mode and also selects which of the mobile-station capabilities that are to be caused to be demonstrated. Selection is made, for instance, through actuation of an actuation key, such as a key of the telephonic keypad, of the mobile station. In one implementation, the user of the mobile station first selects, through actuation of an actuation key, to place the mobile station in the demonstration mode. And, thereafter, the user of the mobile station selects which of the mobile-station capabilities to be caused to be demonstrated while the mobile station remains in the demonstration mode. The user further is able to cause the mobile station to be removed out of the demonstration mode, such as back into an operational mode, when desired.

In another aspect of the present invention, the mobile station includes a user interface having a user display. The selections made by the user of the mobile station are made responsive to display of information upon the user display. In one implementation, a user display lists the modes in which the mobile station is operable, i.e., to include at least an operational mode and a demonstration mode. And, an additional display is displayable on the user display to list the mobile-station capabilities who demonstration can be caused when the mobile station is placed in the demonstration mode.

As the demonstration mode and the demonstration of the selected mobile-station capability permits the selected mobile station capability to be evidenced even when the capability can not be evidenced when the mobile station is operated in an operational mode, the advantages and features provided by the capability are more readily available for viewing by a user of the mobile station.

In these and other aspects, therefore, apparatus, and an associated method, is provided for a mobile station that includes at least a first mobile-station capability. A capability demonstrator is selectably operable to demonstrate the at least the first mobile-station capability of the mobile station. An initiator is selectably for initiating operation of the capability demonstrator. In response to initiation of the operation by the initiator, the capability demonstrator causes demonstration of the at least the first mobile-station capability of the mobile station.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
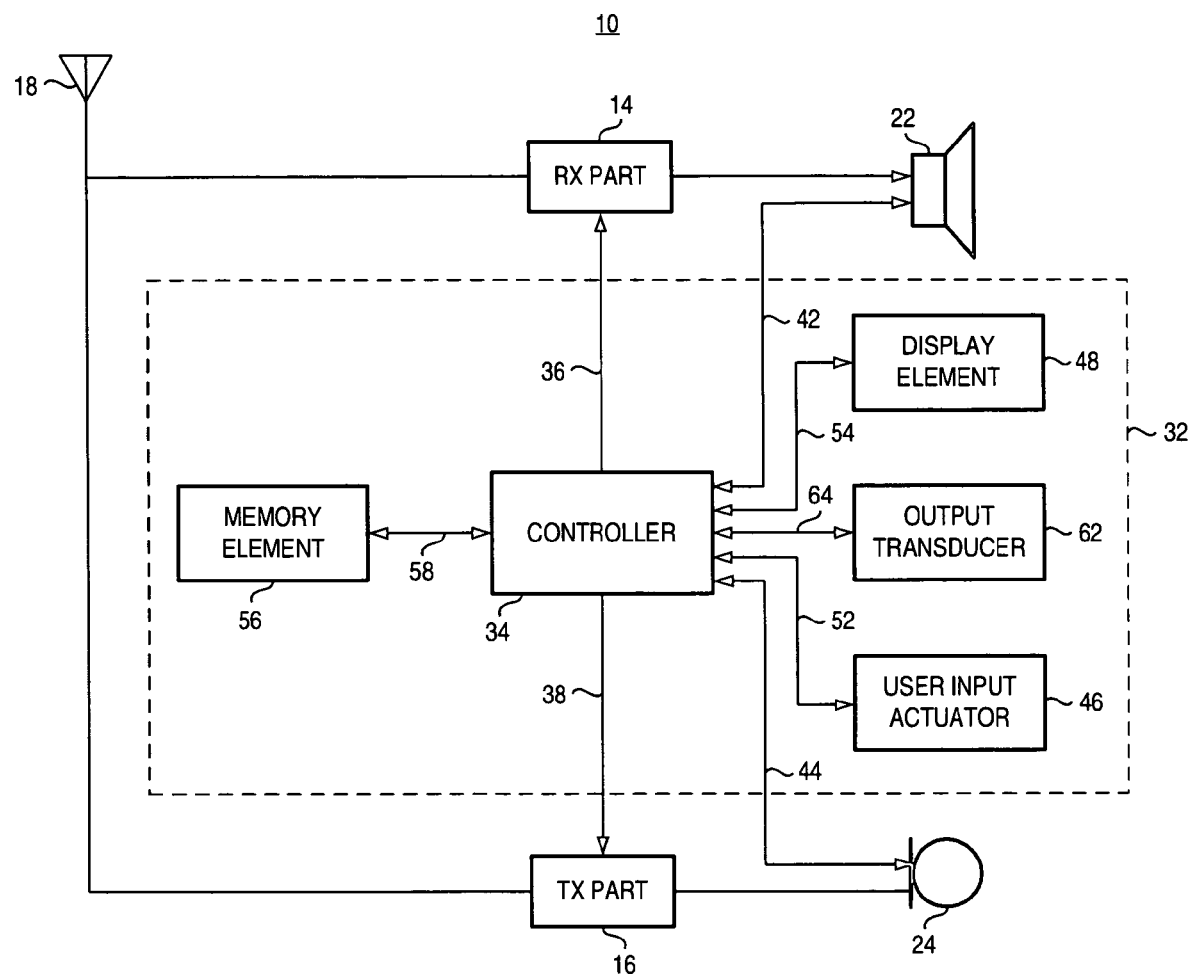
FIG. 1 illustrates a functional block diagram of a mobile station operable pursuant to an embodiment of the present invention.

Referring first to FIG. 1, a radio transceiver, shown generally at 10, operates to transceiver radio communications with another communication device (not separately shown). In the exemplary implementation, the radio transceiver forms a portable mobile station, such as a mobile station utilized in a cellular, or other consumer radio, communication system. While the following description shall describe exemplary operation of the radio transceiver in which the radio transceiver forms a cellular mobile station, the teachings of the present invention are analogously implementable at radio transceivers operable in other types of communication systems. And, more generally, the radio transceiver is further representative of any of various consumer electronic devices operable by a user.

The mobile station formed of the radio transceiver includes transceiver circuitry, represented by a receive part 14 and a transmit part 16. The receive part operates to detect and operate upon communication data communicated to the mobile station and transduced into electrical form by an antenna transducer 18. And, the transmit part operates to transmit communication data sourced at, or otherwise provided to, the mobile station. The transmit part operates upon the communication data to convert the data into a form to permit its communication by the mobile station. Once operated upon by the transmit part, the communication data is transduced in to electromagnetic form by the antenna transducer.

The received communication data, once operated upon by the receive part, is provided to an acoustic transducer, here a speaker element 22. The speaker element transduces electrical signals provided thereto by the receive part into acoustic form, thereby to permit a user of the mobile station to listen to the received communication data. And, the mobile station includes an acoustic transducer forming a microphone 24 that is connected to the transmit part 16. The microphone 24 transduces acoustic energy such as acoustic energy of the spoken voice of a user of the mobile station into electrical form for application to the transmit part.

As noted previously, the mobile station is constructed to provide various mobile station capabilities. Mobile-station capabilities provide any of various advantages, such as increasing the ease of operation of the mobile station, providing additional services to a user of the mobile station, or otherwise provide the mobile station with features that are, in some manner, beneficial to a user of the mobile station. Also as noted previously, sometimes the mobile-station capability can not be evidenced, i.e., viewed or otherwise made evident, to the user of the mobile station. The ability to cause the mobile-station capability to be evidenced to a user of the mobile station is needed, for instance, for training, marketing, or advertising purposes.

The mobile station 10 further includes apparatus 32 of an embodiment of the present invention that provides a manner by which to permit a selected mobile station capability to be evidenced irrespective of the operability of the mobile station, or the communication system with which the mobile station communicates, to permit the mobile-station capability to be evidenced. The apparatus is functionally represented, and is implementable in any desired manner, such as by algorithms executable by processing circuitry.

The apparatus includes a controller 34 that controls various aspects of operation of the mobile station. The controller is coupled to the receive and transmit parts 14 and 16 of the mobile station, such connection indicated by the lines 36 and 38, respectively. The controller is also coupled to the speaker 22 and the microphone 24, such connection indicated by the segments 42 and 44, respectively.

The apparatus further includes a user interface formed of user actuators 46 and a user display 48. And, the controller is further coupled to the user interface inputs and outputs, i.e., the input actuator and the display, by way of the lines 52 and 54, respectively.

The apparatus further includes a memory element 56, the contents of which are accessible by the controller, here by way of the line 58. The controller, in one implementation, further is able to write, and overwrite, data to the memory element. And, the controller is further coupled to an additional output transducer 62, here by way of the lines 64. The additional output transducer is representative of, for instance, a mechanical transducer that converts electrical energy into mechanical movement, such as a vibrating alert device. And, the output transducer is further representative of a lighting device that converts electrical energy into light energy. The output tranducer is, more generally, representative of any transducer that converts electrical energy into energy of another form.

During normal operation of the mobile station, referred to herein as operation of the mobile station in an operational mode, the mobile station operates in conventional manner. That is to say, the mobile station operates conventionally to transceiver communication data pursuant to effectuation of a communication service. Other functionalities of which the mobile station is capable are also carried out conventionally during operation of the mobile station in its operational mode. If, for some reason, a capability of the mobile station is unable to be evidenced during its normal operation, the capability is unavailable at the mobile station.

For instance, if the mobile station is GPRS-capable, that is to say, is capable of communicating high-speed data pursuant to a general packet radio service in a global system for mobile communications (GSM) communication system, but the communication network with which the mobile station communicates is not capable of providing such services, the capability of the mobile station is unable to be evidenced at the mobile station. And, a user of the mobile station is unable to view the operation of the mobile station with respect to this capability. Or, for example, a capability of the mobile station is implemented but software associated with the capability is not fully functional, i.e., free of defects. While waiting for software finalization, the manufacturer of the mobile station might disable operation of the software of the mobile station associated with the specific capability. A user of the mobile station is unable to evidence the capability of the mobile station also pursuant to this scenario. And, for other reasons, capabilities of the mobile station are sometimes not able to be evidenced by, or to, a user of the mobile station.

The apparatus 32, provides, and defines, a demonstration mode in which the mobile station is selectably caused to be operated. When operated in the demonstration mode, a selected mobile-station capability is demonstrated, thereby caused to be evidenced. Irrespective of whether the communication network with which the mobile station communicates is capable of communicating pursuant to the communication service of which the mobile-station capability is associated, the capability of the mobile station is able to be demonstrated to a user when the mobile station is operated in the demonstration mode. Analogously, also when the mobile station is operated in the demonstration mode, the capability of the mobile station is able to be demonstrated irrespective of the operability of the capability, or of the mobile station, in the operational mode.

Selection of in which of the modes to operate the mobile station is made, e.g., by a user of the mobile station through appropriate actuation of the user input actuator 46. And, if selection is made to operate the mobile station in the demonstration mode, further selection is made of which capability to demonstrate. Selection of which capability to demonstrate is, e.g., also made by the user of the mobile station. Thereby, the user of the mobile station is able to demonstrate the capability of the mobile station irrespective of the availability of the capability when the mobile station is operated in a conventional, operational mode.

In the exemplary implementation, the user of the mobile station selects in which mode to operate the mobile station responsive to a display on the display element 48. That is, the controller causes display on the display element of the modes in which the mobile station is capable of being operated. And, the user, through actuation of an appropriate actuation key of the user actuator, selects the mode in which to operate the mobile station. Indications of the selection by the user is provided to the controller, and the controller causes further operation, and further display on the display element, responsive to the selection made by the user. If operation of the mobile station in the demonstration mode is selected, the controller causes further display of the capabilities available for demonstration. And, from the available capabilities listed on the display, the user makes further selection of which one or more of the capabilities should be demonstrated. Displays caused to be displayed by the controller are, in the exemplary implementation, retrieved from the memory element 56. In one implementation, the memory element is updatable as capabilities available at the mobile station change. If, for instance, software upgrades are incorporated at the mobile station, additional capabilities are made available to the mobile station and their demonstration, when the mobile station is operated in the demonstration mode, is also made possible.

When selection is made to cause demonstration of a selected mobile-station capability, the controller operates, as needed, to cause the other elements of the mobile station to effectuate the demonstration of the selected mobile-station capability. Lines 36, 38, 42, 44, 52, 54, 58, and 64 are all representative of signaling lines used by the controller to cause effectuation of demonstration of a selected mobile-station capability.

Figure 2:
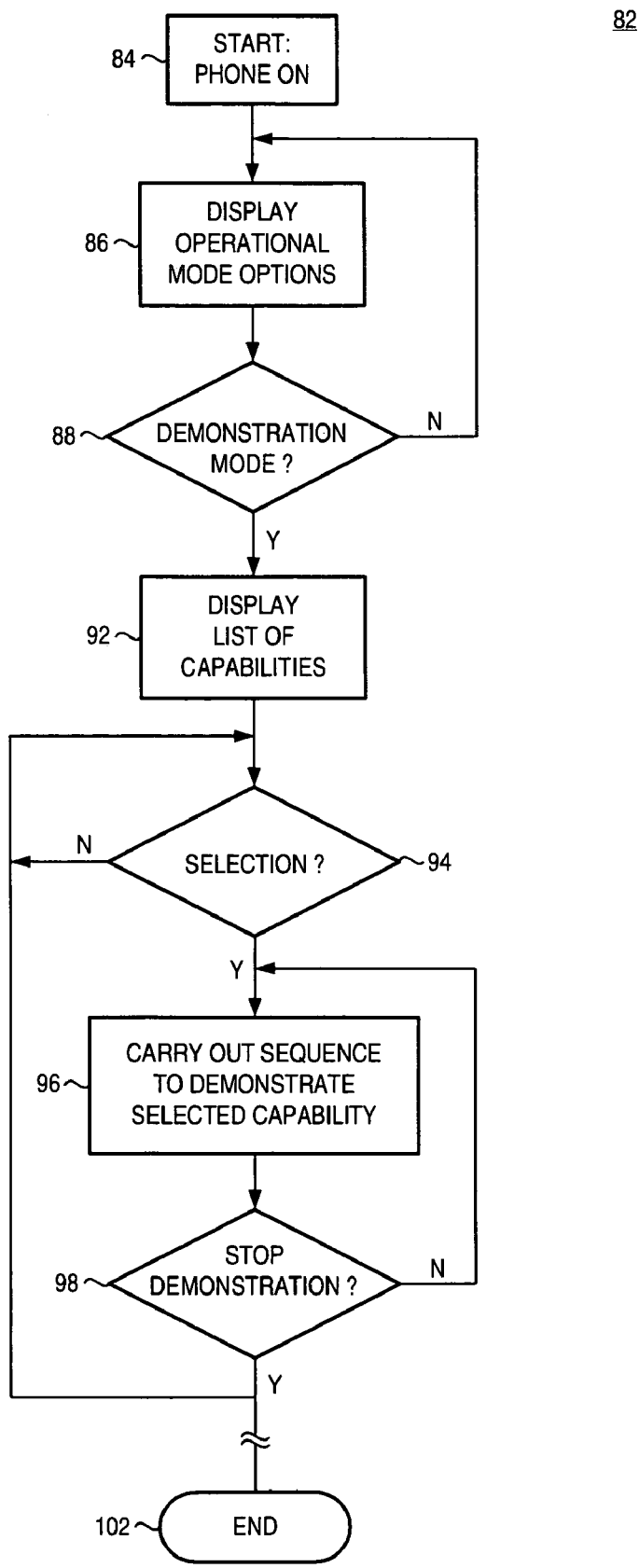
FIG. 2 illustrates a process diagram representative of operation of an embodiment of the apparatus forming a portion of the mobile station shown in FIG. 1.

FIG. 2 illustrates a process diagram, shown generally at 82, representative of exemplary operation of the mobile station pursuant to operation of an embodiment of the present invention. The process 82 commences with powering-up of the mobile station, here indicated by the start: phone on block 84. Then, and as indicated by the block 86, a display is generated and caused to be displayed upon a user display of the mobile station. The display forms a list of available modes in which the mobile station can be operated. Amongst the modes of operation is a demonstration mode.

At the decision block 88, a determination is made as to whether a user of the mobile station has selected operation of the mobile station in a demonstration mode. If not, the no branch is taken elsewhere, such as by way of a loop back to the block 86. Conversely, if the demonstration mode is selected, the yes branch is taken to the block 92, and the list of capabilities available for demonstration at the mobile station when in the demonstration mode is displayed at the user display.

Responsive to the display, the user of the mobile station is able to make selection of which one, or more, of the capabilities are to be demonstrated. The decision block 94 is representative of selection by, and detection of selection of, the one or more capabilities to the demonstrated at the mobile station. If no selection is made, the node branch is taken back to the decision block. Otherwise, the yes branch is taken to the block 96. At the block 96, a sequence associated with the selected mobile-station capability is carried out. Thereby, a viewer of the mobile station is able to view the operation of the mobile station in a manner in which the selected capability is evidenced. The decision block 98 is representative of additional input to the mobile station to terminate the demonstration of the selected capability. If no entry of selection to terminate the demonstration of the capability is entered, the no branch is taken block to the block 96, and the sequence associated with the demonstration of the capability continues. If, however, selection is made to terminate the demonstration of the selected capability, the yes branch is taken, alternately to an end block 102, or back to the decision block 94, as desired, according to different implementations of the process.

Figure 3:
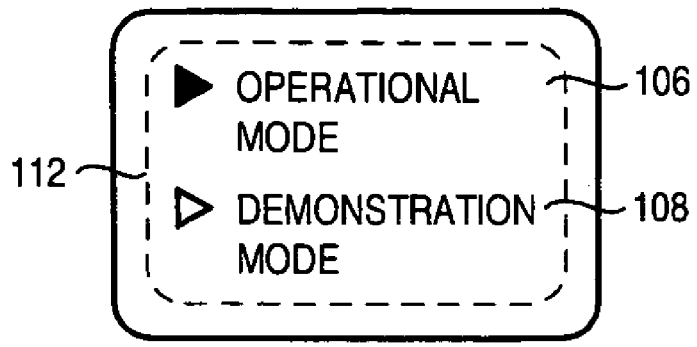
FIG. 3 illustrates an exemplary display generated pursuant to operation of an embodiment of the present invention.

FIG. 3 illustrates an exemplary display 104 displayable on the user display 48 of the mobile station 10 shown in FIG. 1. In this display, the modes in which the mobile station is operable are listed. Here, in operational mode 106 and a demonstration mode 108 form the list 112 displayed on the user display. A user operating the mobiles station selects, such as by way of cursor positioning and user actuation of a user actuator (shown in FIG. 1) of the mode of operation of the mobile station. When the operational mode is selected, the mobile station operates in a conventional, operational mode. And, when the demonstration mode is selected, the mobile station operates to demonstrate selected mobile capabilities of the mobile station.

Figure 4:
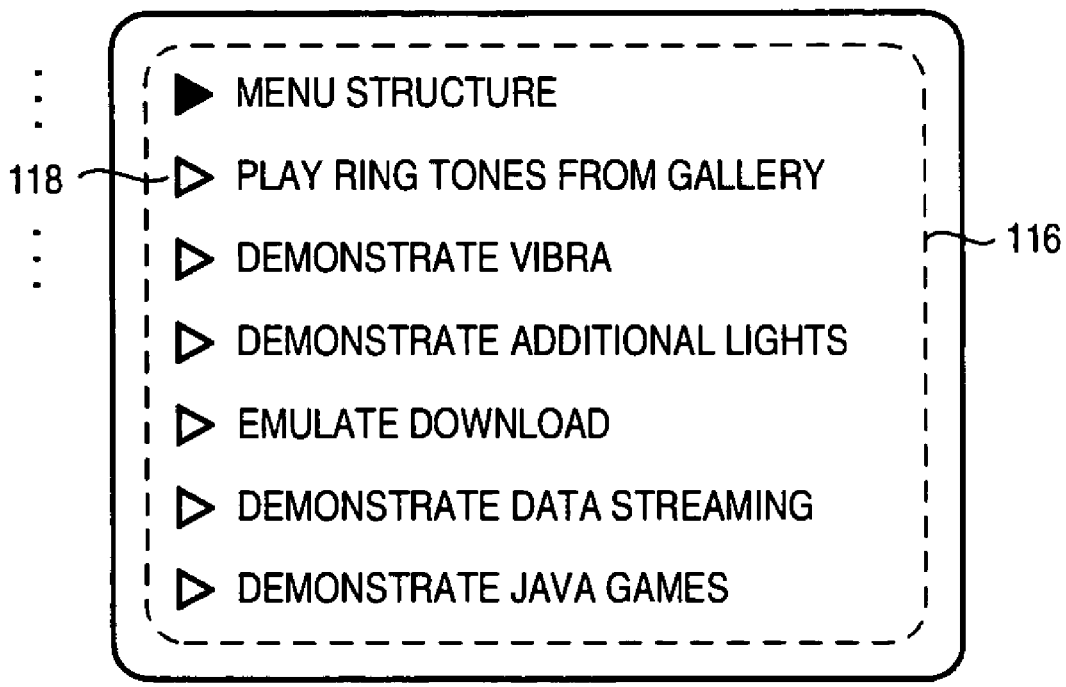
FIG. 4 illustrates another exemplary display generated during operation of an embodiment of the present invention.

FIG. 4 illustrates another exemplary display 114, also displayable upon the display element 48 (shown in FIG. 1). Here, a listing 116 lists entries 118 that identify different capabilities of the mobile station that are demonstrable when the mobile station is operated in the demonstration mode. A user selects from amongst the available entries on the list to cause the mobile station to demonstrate the selected capability or capabilities. In one implementation in which multiple entries are selectable, the entries are carried out in a successive sequence, e.g., according to their sequence of selection by the user.

Figure 5:
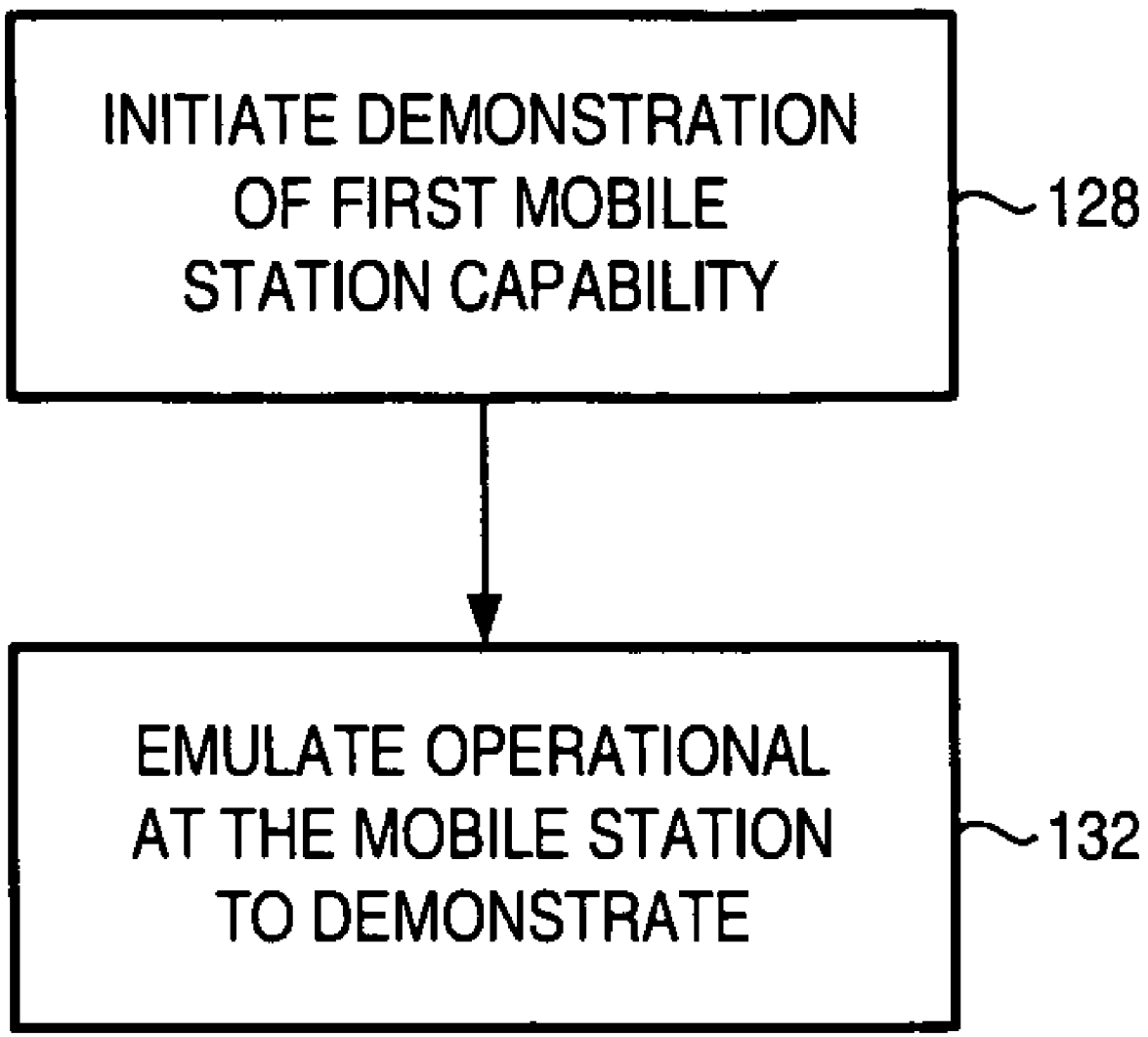
FIG. 5 illustrates a method flow diagram listing the method of operation of an embodiment of the present invention.

FIG. 5 illustrates a method flow diagram, shown generally at 126, representative of the method of operation of an embodiment of the present invention. The method demonstrates operation of the mobile station that has at least a first mobile-station capability.

First, and as indicated by the block 128, demonstration of the at least the first mobile-station capability is initiated. Then, and as indicated by the block 132, the mobile station is caused to emulate operation in a manner that utilizes the at least the first mobile station capability.

Thereby, even if the mobile station is unable, when operated in a conventional operational mode, to evidence a mobile-station capability, operation of the mobile station in the demonstration mode permits demonstration of the capability.

The previous descriptions are of preferred examples for implementing the invention, and the scope of the invention should not necessarily be limited by this description. The scope of the present invention is defined by the following claims.

What is claimed is:

1. A method comprising:

displaying a list of a plurality of non-operational mobile station capabilities on a display of a mobile station, the capabilities including at least one communication service that is supported by the mobile station, but is incompatible with a wireless communication network to which the mobile station is communicatively coupled at a time of the displaying;

receiving a user selection of one of said capabilities for demonstration;

initiating demonstration of the selected mobile-station capability; and causing the mobile station to emulate operation thereof in a manner that gives an appearance of the mobile station transmitting data to the wireless communication network using a communication service that is not yet functional at the communication network at a time of the emulating.

2. The method of claim 1 wherein said operation of initiating demonstration comprises actuating, by a user of the mobile station, a user actuator.

3. The method of claim 2 wherein the mobile station comprises a user display and wherein said method further comprises the operation, prior to said operation of initiating, of displaying identifiers, identifying at least the selected mobile-station capability, and wherein said operation of initiating is performed responsive thereto.

4. The method of claim 1 wherein the selected mobile-station capability comprises a plurality of mobile-station capabilities and wherein said method of initiating further comprises selecting which of the plurality of mobile-station capabilities to cause emulation of operation thereof.

5. The method of claim 4 wherein said operation of selecting comprises selecting a first mobile-station capability and at least a second mobile-station capability and wherein said operation of causing emulation comprises causing emulation of each of the first and at least second mobile-station capabilities.

6. The method of claim 1 wherein the selected mobile-station capability is associated with an external communication service and wherein said operation of causing further comprises causing emulation of an aspect of the external communication service.

7. An apparatus, comprising:
a mobile station with a display; and
a controller configured to:
display a listing of modes on said display, said listing including at least one operational mode and at least one demonstration mode for said mobile station;
in response to a user selection of said demonstration mode from said listing of modes, display a listing of a plurality of non-operational mobile station functions on said display, said non-operational mobile station functions including at least one function that is supported by said mobile station but not by a wireless communication network servicing said mobile station; and
in response to a user selection of one of said non-operational mobile station functions, emulate operation of said selected non-operational mobile station function, wherein said emulating gives an appearance of said mobile station transmitting data to said wireless communication network using a data communication function, without actually transmitting said data to said wireless communication network using said data communication function.

8. The apparatus of claim 7, wherein said controller is configured to, in response to a user selection of a plurality of said non-operational mobile station functions, emulate said selected plurality of non-operational mobile station functions, wherein said emulating demonstrates said selected non-operational mobile station functions without performing said selected non-operational mobile station functions.

9. The apparatus of claim 8, wherein said controller is configured to, in response to said user selection of said plurality of said non-operational mobile station functions, emulate said selected plurality of non-operational mobile station functions in a sequential order.

10. The apparatus of claim 9, wherein said sequential order is determined based on a sequence in which said selected plurality of non-operational mobile station functions was selected by a user.

11. The apparatus of claim 9, wherein said sequential order is pre-ordained.

12. The apparatus of claim 7, wherein said selected non-operational function corresponds to an external communication service, and wherein said emulating simulates communication with said external communication service.

13. The apparatus of claim 7, wherein said controller is further configured to switch modes of operation from said demonstration mode to said operational mode in response to user request.

14. A method, comprising:
displaying a listing of modes of operation on a mobile telephone display, said listing including at least one operational mode and at least one demonstration mode for said mobile telephone;
receiving user selection of said demonstration mode from said listing of modes, and in response displaying a listing of a plurality of non-operational mobile telephone functions on said display, said functions including at least one function supported by said mobile telephone but not by a wireless network to which said mobile telephone is communicatively coupled at a time of the user selection;
receiving user selection of one of said listed non-operational mobile telephone functions, and in response emulating operation of said selected non-operational mobile telephone function, wherein said emulating gives an appearance of said mobile telephone transmitting data to a wireless communication network using a service that is not yet available at the wireless communication network.

15. The method of claim 14, further comprising receiving user selection of a plurality of said listed non-operational mobile telephone functions, and in response emulating said selected plurality of non-operational mobile telephone functions, wherein said emulating demonstrates said selected non-operational mobile telephone functions without performing said selected non-operational mobile telephone functions.

16. The method of claim 15, wherein said emulating emulates said selected plurality of non-operational mobile telephone functions in a sequential order.

17. The method of claim 16, wherein said sequential order is determined based on a sequence in which said selected plurality of non-operational mobile telephone functions was selected by a user.

18. The method of claim 16, wherein said sequential order is pre-ordained.

19. The method of claim 14, wherein said selected non-operational mobile telephone function corresponds to an external communication service, and wherein said emulating simulates communication with said external communication service.

20. The method of claim 14, further comprising switching modes of operation of said mobile telephone from said demonstration mode to said operational mode in response to user request after said emulating.

21. A computer-readable medium storing computer-executable instructions for performing the following when executed:
displaying a list of a plurality of non-operational mobile station capabilities on a display of a mobile station, the capabilities including at least one communication service that is supported by the mobile station, but is incompatible with a wireless communication network to which the mobile station is communicatively coupled at a time of the displaying;

receiving a user selection of one of said capabilities for demonstration;

initiating demonstration of the selected mobile-station capability; and causing the mobile station to emulate operation thereof in a manner that simulates the selected mobile-station capability, demonstration of which gives an appearance of said mobile station transmitting data to the wireless communication network using a communication service that is not yet functional at the communication network at a time of the emulating.

22. The computer-readable medium of claim 21, wherein said operation of initiating demonstration comprises actuating, by a user of the mobile station, a user actuator.

23. The computer-readable medium of claim 22 wherein the mobile station comprises a user display and wherein said instructions further include instructions for the operation, prior to said operation of initiating, of displaying identifiers, identifying at least the selected mobile-station capability, and wherein said operation of initiating is performed responsive thereto.

24. The computer-readable medium of claim 21 wherein the selected mobile-station capability comprises a plurality of mobile-station capabilities and wherein said initiating further comprises selecting which of the plurality of mobile-station capabilities to cause emulation of operation thereof.

25. The computer-readable medium of claim 24 wherein said selecting comprises selecting a first mobile-station capability and at least a second mobile-station capability and wherein said causing emulation comprises causing emulation of each of the first and at least second mobile-station capabilities.

26. The computer-readable medium of claim 21 wherein the selected mobile-station capability is associated with an external communication service and wherein said causing further comprises causing emulation of an aspect of the external communication service.

* * * * *

UNITED STATES PATENT AND TRADEMARK OFFICE
CERTIFICATE OF CORRECTION

| | | |
|---|---|---|
| PATENT NO. | : 7,418,259 B2 | Page 1 of 1 |
| APPLICATION NO. | : 11/032506 | |
| DATED | : August 26, 2008 | |
| INVENTOR(S) | : Esa Juntunen | |

It is certified that error appears in the above-identified patent and that said Letters Patent is hereby corrected as shown below:

Title page, item [56] col. 2, line 8
In the References Cited U.S. Patent Documents
    Please replace "2006/0072821" with --2006/0073821--.

Signed and Sealed this

Twenty-fourth Day of March, 2009

JOHN DOLL
*Acting Director of the United States Patent and Trademark Office*